United States Patent [19]
Gadkaree et al.

[11] Patent Number: 5,750,026
[45] Date of Patent: *May 12, 1998

[54] DEVICE FOR REMOVAL OF CONTAMINANTS FROM FLUID STREAMS

[75] Inventors: Kishor P. Gadkaree, Big Flats; Timothy V. Johnson, Corning, both of N.Y.

[73] Assignee: Corning Incorporated, Corning, N.Y.

[*] Notice: The term of this patent shall not extend beyond the expiration date of Pat. No. 5,451,444.

[21] Appl. No.: 784,165

[22] Filed: Jan. 15, 1997

Related U.S. Application Data

[63] Continuation of Ser. No. 459,450, Jun. 2, 1995, abandoned.

[51] Int. Cl.$^6$ .................. C02F 1/28; B01D 24/46
[52] U.S. Cl. .................. 210/502.1; 210/506; 210/510.1; 55/523; 55/524; 55/DIG. 10; 55/DIG. 30; 95/278; 95/283; 95/285; 95/126; 96/126; 96/130; 96/146; 96/154; 502/87; 502/418; 502/429; 502/439
[58] Field of Search .................. 55/DIG. 10, DIG. 30, 55/523, 524, 419, 467, 472, 476; 210/502.1, 504, 506, 510.1, 269, 243, 670; 95/68, 126, 228, 148, 283, 285, 901; 96/126, 130, 146, 152, 154; 204/131; 428/118; 502/56, 78, 80, 87, 402, 418, 419, 429, 439

[56] References Cited

U.S. PATENT DOCUMENTS

| | | | |
|---|---|---|---|
| 3,922,412 | 11/1975 | Yoshikawa et al. | 428/118 |
| 4,329,162 | 5/1982 | Pitcher, Jr. | 55/523 |
| 4,399,052 | 8/1983 | Sugino | 252/421 |
| 4,411,856 | 10/1983 | Montierth | 264/267 |
| 4,415,344 | 11/1983 | Frost et al. | 55/523 |
| 4,518,704 | 5/1985 | Okabashi et al. | 502/80 |
| 4,758,272 | 7/1988 | Pierotti et al. | 75/246 |
| 4,781,831 | 11/1988 | Goldsmith | 210/247 |
| 4,934,142 | 6/1990 | Hayashi et al. | 60/297 |
| 4,948,567 | 8/1990 | Atarushiya | 422/122 |
| 4,992,233 | 2/1991 | Swaroop et al. | 419/2 |
| 5,009,781 | 4/1991 | Goldsmith | 210/247 |
| 5,043,310 | 8/1991 | Takeuchi et al. | 502/404 |
| 5,108,601 | 4/1992 | Goldsmith | 210/247 |
| 5,212,140 | 5/1993 | Yoshimoto et al. | 502/300 |
| 5,215,690 | 6/1993 | Golino et al. | 264/29.6 |
| 5,221,484 | 6/1993 | Goldsmith et al. | 210/650 |
| 5,258,150 | 11/1993 | Merkel et al. | 264/43 |
| 5,260,035 | 11/1993 | Lachman et al. | 422/180 |
| 5,284,638 | 2/1994 | Hertl et al. | 423/245.1 |
| 5,288,306 | 2/1994 | Aibe et al. | 95/141 |
| 5,303,547 | 4/1994 | Mieville et al. | 60/274 |
| 5,306,675 | 4/1994 | Wu et al. | 502/5 |
| 5,308,457 | 5/1994 | Dalla Betta et al. | 204/131 |

(List continued on next page.)

FOREIGN PATENT DOCUMENTS

| | | |
|---|---|---|
| 0 135 945 | 4/1985 | European Pat. Off. |
| 0 488 716 A1 | 6/1992 | European Pat. Off. |
| 0 608 539 A1 | 8/1994 | European Pat. Off. |
| 0 648 535 A1 | 4/1995 | European Pat. Off. |
| 41 04 513 A1 | 8/1991 | Germany |

*Primary Examiner*—Cynthia L. Nessler
*Attorney, Agent, or Firm*—L. Rita Quatrini

[57] ABSTRACT

A device for purifying a workstream of contaminants and method of making. One device is made of an inorganic monolithic porous particulate filter and a continuous uninterrupted coating of activated carbon impregnated into the pores of the filter. Preferably the filter has inlet and outlet faces, and a multiplicity of cells separated by porous walls and extending longitudinally and mutually parallel therethrough from inlet to outlet end, a portion of the total number of cells being plugged at the inlet end face, and the remaining portion of the total number of cells being plugged at the outlet end face of the device. Another device can be made entirely of activated carbon having the multicellular structure. A workstream containing contaminants is passed through the device to cause retention of the contaminants. The device can have electrically conducting mechanism for conducting electric current therethrough for removal of the contaminants and regeneration of the device.

12 Claims, 2 Drawing Sheets

U.S. PATENT DOCUMENTS

| | | | |
|---|---|---|---|
| 5,356,852 | 10/1994 | DeLiso et al. | 502/402 |
| 5,451,444 | 9/1995 | DeLiso et al. | 428/116 |
| 5,451,554 | 9/1995 | Guile et al. | 502/80 |
| 5,458,834 | 10/1995 | Faber et al. | 264/109 |
| 5,472,676 | 12/1995 | Terui et al. | 423/219 |
| 5,487,917 | 1/1996 | Gadkaree et al. | 427/228 |
| 5,488,023 | 1/1996 | Gadkaree et al. | 502/182 |
| 5,510,063 | 4/1996 | Gadkaree et al. | 264/29.7 |
| 5,510,599 | 4/1996 | Gadkaree et al. | 264/29.7 |

DEVICE FOR REMOVAL OF CONTAMINANTS FROM FLUID STREAMS

This application is a continuation of U.S. application Ser. No. 08/459,450, filed Jun. 2, 1995, now abandoned.

This invention relates to a device for removal of contaminants from a workstream, and to the method of making and using the device. It is especially useful for filtering out particulates and adsorbing volatile organic compounds (VOC's) from fluid streams, and for catalyzing chemical reactions. The device is made of a porous filter having activated carbon in some form, either as a continuous coating on a substrate filter or an activated carbon body filter. The device can have electrically conducting means for conducting an electric current therethrough.

BACKGROUND OF THE INVENTION

In many diverse situations, such as filtration of drinking water and removal of contaminants from industrial process streams, filtration of incoming air in automotive cabins, etc., it is desirable to remove particulate matter as well as vapor phase contaminants such as VOC's from a fluid stream. Normally the objective is accomplished by employing two different devices: a particulate removal filter, and a VOC removal device. The particulate filter consists of a physical barrier with small enough openings, to prevent particles of the designated size and larger from flowing through. Such a barrier is typically a screen of a suitable material. This can be a polymer membrane or a woven or non-woven screen. To remove volatile contaminants such as VOC's, some type of adsorber such as activated carbon is used in the form of granules or powders. The carbon is packed in a bed through which the fluid stream flows and the contaminants are removed from the stream by adsorption. It is more expensive and difficult to put the two different systems together as one device. Some devices have a particulate filter and an activated carbon filter combined, but the VOC removal is done by adsorber and particulate removal is done by a separate layer.

The present invention provides an economical device incorporating both particulate filter and VOC removal. Another advantage is that it provides high geometric surface area per unit volume of filtration. Still another advantage is that it can be regenerated electrically by removing adsorbed VOC's and eliminating microorganisms that can grow on activated carbon in moist environments.

SUMMARY OF THE INVENTION

In accordance with one aspect of the invention, there is provided a device for purifying a workstream, which is made of a monolithic porous particulate filter, and a continuous uninterrupted coating of activated carbon distributed over the outer surface and in the pores of the filter. Preferably the filter is a multicellular monolith having inlet and outlet faces, and a matrix of porous walls defining a plurality of cells extending longitudinally and mutually therethrough between the inlet and outlet faces, a portion of the total number of cells being plugged at the inlet end face, and the remaining portion of the total number of cells being plugged at the outlet end face of the filter.

In accordance with another aspect of the invention, there is provided a device for removal of contaminants from a workstream which is an activated carbon monolithic structure having a multicellular configuration as described above.

In accordance with another aspect of the invention, there is provided a method for making a device for removal of contaminants from a workstream which involves providing an inorganic monolithic porous filter, impregnating the pores of the filter with a carbon precursor, curing the carbon precursor, carbonizing the cured carbon precursor to form a uniform adherent continuous coating of carbon on the filter, and activating the carbon to form a continuous coating of activated carbon on the filter and form a particulate and VOC removal device.

In accordance with another aspect of the invention, there is provided a device for removal of contaminants from a workstream which involves providing a multicellular activated carbon structure having inlet and outlet end faces, and a matrix of porous walls defining a plurality of cells extending longitudinally and mutually parallel therethrough between the inlet and outlet end faces, and plugging a portion of the total number of cells at the inlet end face, and plugging the remaining portion of the total number of cells at the outlet end face to form the filter.

In accordance with another aspect of the invention, there is provided a method of removing contaminants from a workstream which involves passing the workstream through any of the above described devices.

In accordance with another aspect of the invention, any of the above described devices can be made into a regenerable device by providing electrically conducting means on the device. The electrically conducting means provide heat to the device for applications which require heat.

In accordance with another aspect, the device can have a catalyst thereon for catalyzing a chemical reaction.

The devices are suitable for a number of applications including particulate removal, water purification and chemical reaction catalysis applications, etc.

DETAILED DESCRIPTION OF THE INVENTION

This invention relates to a single device for removing contaminants from a fluid workstream. It can be used both filtering particulates and removal of VOC's, e.g. toluene, ethylbenzene, methylene chloride, trichloroethylene, etc. from a workstream. The device is suitable for use in water purification applications with or without filtration. One water purification application is a combination hydrocarbon/fine particulate filter in residential point-of-use applications. Also the device is suitable for use in chemical reaction catalysis applications.

The device can be made of a porous inorganic monolithic filter for particulates having a coating of activated carbon wherein the filter serves as a substrate for the activated carbon coating. Preferably the coating is a continuous adherent uninterrupted activated carbon impregnated into the pores of the filter. The coating can also be distributed over the outer surface of the filter.

The filter can be a shaped body of activated carbon.

The device can have electrically conducting means for conducting an electric current therethrough.

The filter can be any of those known in the art. The only requirements are that the filter have enough strength to function in the application, and have pores extending from its outer surface into the filter, and be capable of withstanding the heat-treating temperatures encountered in its environment.

The overall open porosity of the filter can vary from very low e.g., 0.1 vol. % to higher. Generally, it is desirable that the overall open porosity be at least about 10%, preferably greater than about 25% and most preferably greater than about 40%. For most purposes, the desirable range of porosity is about 45% to about 70%. Preferably the pores of the filter material create "interconnecting porosity" which is characterized by pores which connect into and/or intersect other pores to create a tortuous network of porosity within the filter.

Pore sizes can vary also. Typically the median pore size as measured by mercury porosimetry ranges from about 0.05 to 50 and more typically about 0.5 to 15 micrometers in diameter.

Porous filter materials include both electrically non-conducting and electrically conducting materials. Some especially suited substrate materials are ceramic, glass ceramic, glass, metal, and combinations thereof. By combinations is meant physical or chemical combinations, eg., mixtures, compounds, or composites. Molecular sieves, e.g. zeolites are also suitable filter materials.

Some materials that are especially suited to the practice of the present invention, although it is to be understood that the invention is not limited to such, are those made of cordierite, mullite, clay, talc, zircon, zirconia, zirconates, zirconia-spinel, zeolites, magnesium alumino-silicates, spinel, alumina, silica, silicates, borides, alumino-silicates, eg., porcelains, lithium aluminosilicates, alumina silica, feldspar, titania, fused silica, nitrides, borides, carbides, eg., silicon carbide, silicon nitride, or mixtures of these. Especially useful filter materials are cordierite and/or mullite. Cordierite is preferred because its coefficient of thermal expansion is comparable to that of carbon, increasing the stability of the activated carbon body.

The invention is suitable for use with metal filters. These filters can be made of any sinterable metal or metal composition. Especially suited are iron group metal, chromium, and aluminum compositions, with the preferred iron group metal being iron. Especially preferred is Fe, Al, and Cr. For example, Fe5–20Al5–40Cr, and Fe7–10Al10–20Cr powders with other possible additions are especially suited. Some typical compositions of metal powders are disclosed in U.S. Pat. Nos. 4,992,233, 4,758,272, and European patent application publication no. 488716A1, which are herein incorporated by reference as filed. U.S. Pat. No. 4,992,233 relates to methods of producing porous sintered bodies made from metal powder compositions of Fe and Al with optional additions of Sn, Cu, and Cr. European patent application publication no. 488716A1 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general the metal and/or metal alloy powders and optionally rare earth oxide powders are mixed in amounts to result in the body having the desired composition. The starting metal powders are iron, cobalt, nickel, chromium, aluminum metals, and special metal powders, if they are to be used. The metal can be supplied in either the unalloyed form or alloyed with one or more of the other metals, or partially unalloyed and partially alloyed. Most typically, however, the iron, when added as the balance, is in the elemental form. The chromium can be elemental or alloyed with aluminum or iron. Chromium-aluminum alloy is preferable. Typically, the aluminum is supplied alloyed with iron and/or chromium for stability. Some typical alloy powders that can be used in formulating the mix to yield a body having some typical compositions of the present invention are Fe—Cr—Al— (Y, lanthanide series elements, Zr, Hf, or Cu) alloy powder, Cr—Al—(Y, lanthanide series elements, Zr, Hf, or Cu) alloy powder, Fe—B, Fe—Si powder, etc.

The filter is preferably in the shape of a honeycomb having a matrix of thin porous walls which form a multiplicity of cells or channels extending between the ends of the honeycomb. Such filters having flow through walls are preferred because they allow high flow through rates.

Some examples of honeycombs produced by the process of the present invention, although it is to be understood that the invention is not limited to these, are those having about 172 cells/cm$^2$ (1100 cells/in$^2$), about 94 cells/cm$^2$ (600 cells/in$^2$), about 62 cells/cm$^2$ (400 cells/in$^2$), or about 47 cells/cm$^2$ (300 cells/in$^2$), those having about 31 cells/cm$^2$ (200 cells/in$^2$), or about 15 cells/cm$^2$ (100 cells/in$^2$), or about 2.5 cells/cm$^2$, (16 cells/in$^2$) or about 1.5 cells/cm$^2$ (9 cells/in$^2$).

Wall (web) thicknesses range typically from about 0.1 to about 1.3 mm (about 4 to about 50 mils) for most applications and it is to be understood that the invention is not limited to these dimensions. The external size and shape of the body is controlled by the application and is not limited to those described above. For example, other combinations of cell densities and wall thicknesses can be made.

The filter can be fabricated in a number of ways. For example, a ceramic honeycomb with straight channels or cells is manufactured according to methods well known in the art.

One method is to shape a mixture of raw materials such as by extrusion followed by heat-treating. The wall porosity of the honeycomb is controlled by the raw materials used during the manufacture and the process conditions during fabrication. A burnout agent such as graphite, carbon powder, wood fibers, cellulose, etc. are typically used during extrusion which burns off during subsequent high temperature processing, leaving pores of the size determined by the size of the burnout agent particulates. Porosity can also be controlled by choosing appropriate raw materials which form porosity during sintering. Such a honeycomb is then impregnated with a carbon precursor material which is subsequently cured, carbonized, and the carbon activated. The alternate channels are blocked by plugs of ceramic material, polymers, etc., or plugs formed by the precursor itself. This plug formation can be carried out before the precursor impregnation or after the impregnation but before the carbonization or after the carbonization and activation is complete.

Some especially suited filters and/or filter materials, and method of making them are disclosed in U.S. Pat. Nos.

4,329,162, 4,411,856, 4,415,344, and 5,258,150 which are herein incorporated by reference as filed.

Figure 1:
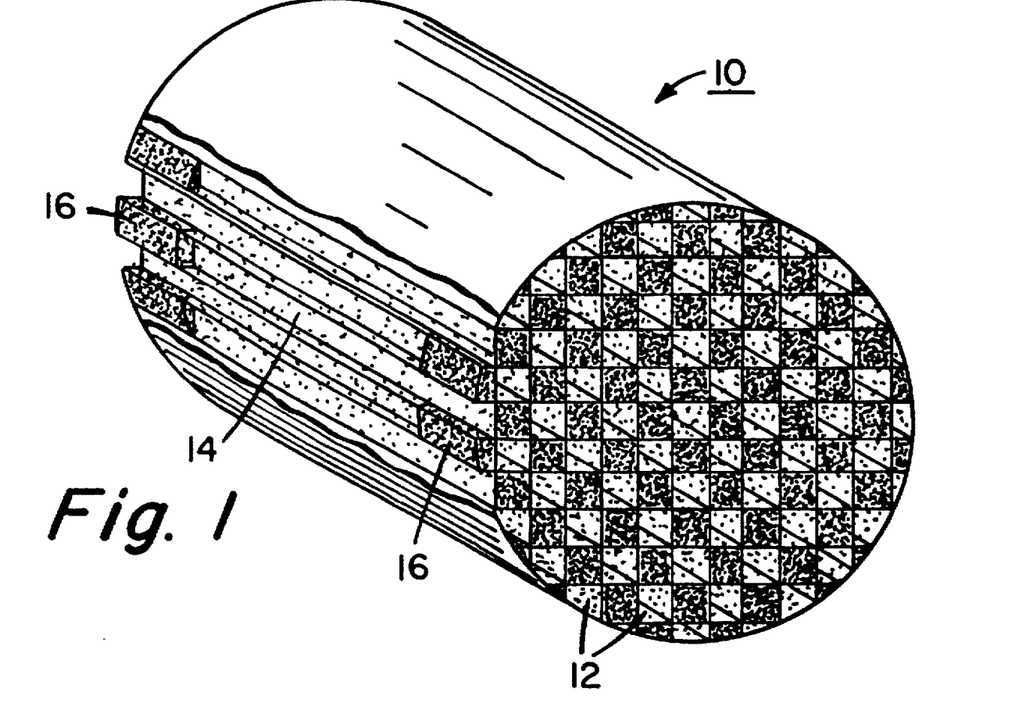
FIG. 1 is a schematic diagram of a device of the present invention which is a multicellular filter having a carbon coating.
Figure 2:
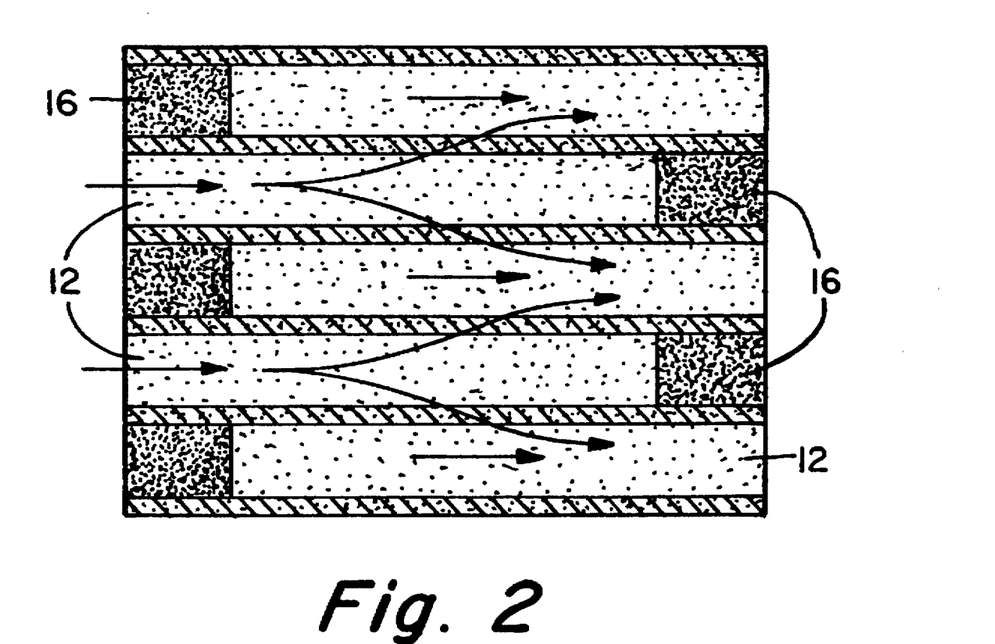
FIG. 2 is a schematic diagram of the inside of the device of FIG. 1 showing the cells along their length and the plugging of some of the cells.

The most typical filter is a honeycomb structure having an inlet face and outlet face as shown in FIG. 1. A portion of the cells on the inlet face are plugged. The plugging is only at the ends of the cells which is typically about 9.5 to 13 mm although this can vary. A portion of cells on the outlet face but different from those on the inlet face are plugged so that each cell is plugged only at one end face. The preferred arrangement is to have every other cell on a given face plugged as in a checkered pattern as shown in FIG. 1. FIG. 1 is a schematic diagram of a filter with alternate cells plugged. FIG. 2 is a view of the inside of the filter showing a number of cells along their entire length and the plugging.

One advantage of multicellular plugged filters is that the plugging configuration allows more intimate contact between fluid or workstream medium and the activated carbon adsorbent, especially in the case of a liquid medium. For example, this configuration is especially advantageous in water purification and chemical reaction catalytic applications.

Some especially preferred filters are supplied by Corning, Inc. and are commonly known as diesel particulate filters.

Other suitable filters are cross flow devices such as those disclosed in U.S. Pat. Nos. 4,781,831, 5,009,781, and 5,108,601 which are herein incorporated by reference.

By carbon precursor is meant a carbon-containing substance that converts to continuous structure carbon on heating. For purposes of this invention, a carbon precursor is in the form of a solution or low viscosity liquid at ambient temperatures or capable of being liquified by heating or other means, and suitable for penetrating through to the porosity of the substrate filter.

A carbon precursor is preferred over activated carbon particle coating because as a result of curing, carbonizing and activating, the carbon atoms are arranged in a continuous uninterrupted structure of random three dimensional graphitic platelets. The platelets have angstrom sized pores typically about 5 to about 50 angstroms for adsorption as distinguished from micron-size pores. Pores in several hundred micron size range can be present in the activated carbon, but they do not contribute to adsorption capacity. Upon curing and carbonizing, a coating is produced that is physically interlocked within the interconnecting porosity of the substrate. Impregnating substrates with carbon precursors followed by curing, carbonizing, and activating is described in EPO patent application publication no. 608, 539. That publication is herein incorporated by reference.

Carbon precursors useful in this embodiment of the present invention include any liquid or liquefiable carbonaceous substance. Examples of useful carbon precursors include thermosetting resins, thermoplastic resins (e.g., polyvinylidene chloride, polyvinyl chloride, polyvinyl alcohol, and the like), sugar solutions, furfuryl alcohol, and coal tar pitch.

Low viscosity carbon precursors (e.g., thermosetting resins) are preferred because their low viscosity allows greater penetration of the carbon precursor into porous inorganic substrates. Typical resin viscosity ranges from about 50 to 1000 cps. Phenolic resins are most preferred due to their low viscosity, high carbon yield, high degree of cross-linking upon curing relative to other precursors, and low cost. The carbon precursor liquid used in the present method can include a single precursor material or a mixture of two or more precursor materials. Optionally, activated carbon can be added to the carbon precursor liquid to increase the adsorptive capability of the activated carbon structure.

Any high carbon yield resin can be used. By high carbon yield is meant that greater than about 10% of the starting weight of the resin is converted to carbon on carbonization. Phenolic and furan resins are the most suitable. One especially suitable furan liquid resin is Furcarb-LP from QO Chemicals Inc. Another suitable resin is phenolic resole resin such as 43250 plyophen resin from Occidental Chemical Corp.

The contacting is done by any method suitable to bring the carbon precursor in intimate contact with the inorganic substrate. Exemplary methods of contacting include dipping the substrate in the precursor solution (or liquid) or spraying the precursor solution (or liquid) directly on the substrate.

The carbon precursor liquid penetrates into the interconnecting porosity of the substrate. For example, for honeycombs, the coating is present on the outer surfaces as well as on the webs or walls.

The eventual quantity of carbon formed on the substrate is dependent on the amount of carbon precursor retained by the substrate. The amount of carbon precursor retained by the substrate can be increased eg., by contacting the substrate with the precursor more than once and allowing the substrate to dry between contacting steps. In addition, the amount of precursor retained by the substrate can be controlled in porous substrates by simply modifying the overall porosity of the substrate (e.g., increasing porosity will increase the amount of precursor retained by the substrate and in turn the amount of carbon formed thereon).

The substrate and carbon precursor are then subjected to heat-treatments to cure the precursor and thereafter convert the precursor to continuous carbon (carbonize). The resulting carbon-coated substrate is then heat-treated to activate the carbon and produce an activated carbon structure.

The curing is accomplished typically by heating the coated substrate to temperatures of about 100° C. to about 200° C. for about 0.5 to about 5.0 hours. Curing is generally performed in air at atmospheric pressures. When using certain precursors, (e.g., furfuryl alcohol) curing can be accomplished by adding an acid catalyst at room temperature.

The curing catalysts can be any of those known in the art. Some typical curing catalysts are ammonium chloride, ammonium nitrate, zinc chloride, citric acid, and paratoluene sulphonic acid (PTSA) or combinations of these. The preferred catalysts are zinc chloride and PTSA because they have been found to result in the highest amount of activated carbon in the structure when all other factors are constant.

Carbonization is the thermal decomposition of the carbonaceous material, thereby eliminating low molecular weight species (e.g., carbon dioxide, water, etc.) and producing a fixed carbon mass and a rudimentary pore structure in the carbon.

Such conversion or carbonization of the cured carbon precursor is accomplished typically by heating the substrate to a temperature in the range of about 600° C. to about 1000° C. for about 1 to about 10 hours in a reducing or inert atmosphere (e.g., nitrogen, argon, etc.).

Curing and carbonizing the carbon precursor on the substrate results in a structure having a coating extending over the entire surface of the substrate in the form of a substantially uninterrupted layer of carbon. This carbon coating is anchored into the porosity of the substrate and as a result is highly adherent. The top surface of the carbon coating is an uninterrupted layer of carbon to carbon bonds.

As discussed above, if interconnecting porosity is present in the substrate, an interlocking network of carbon will be formed within the composition, resulting in an even more adherent carbon coating. The coating of uninterrupted carbon extending over the outer surface of the substrate formed provides a structure with advantages of high adsorptive capability despite a relatively low carbon content, high strength, and high use temperatures. Structures can be formed which contain carbon in an amount less than and up to about 50%, and often less than and up to about 30% of the total weight of the substrate and carbon.

The activating is done to substantially enhance the volume and to enlarge the diameter of the micropores formed during carbonization, as well as to create new porosity. Activation creates a high surface area and in turn imparts high adsorptive capability to the structure. Activation is done by known methods such as exposing the structure to an oxidizing agent such as steam, carbon dioxide, metal chloride (e.g., zinc chloride), phosphoric acid, or potassium sulfide, at high temperatures (e.g., about 600° C. to about 1000° C.).

The activated carbon coating of the above-described activated carbon structure is highly resistant to chipping and flaking, exhibits high strength and is highly resistant to high temperatures in comparison with carbon coatings produced by dipping a substrate in a slurry of activated carbon and binder. In addition, these carbon-coated structures exhibit adsorptive capabilities higher than extruded carbon structures or coated substrates where the coating is made directly from carbon. FIGS. 1 and 2 show a filter having a carbon coating.

FIG. 1 shows a filter (10) in the shape of a honeycomb with cells (12) alternately plugged in a checkered pattern, showing plugs as (16). The coating in the porosity of the cell walls is shown as (14).

FIG. 2 is a view of the inside of the device of FIG. 1 showing the cells along their length and the plugging of some of the cells.

Figures 3, 4:
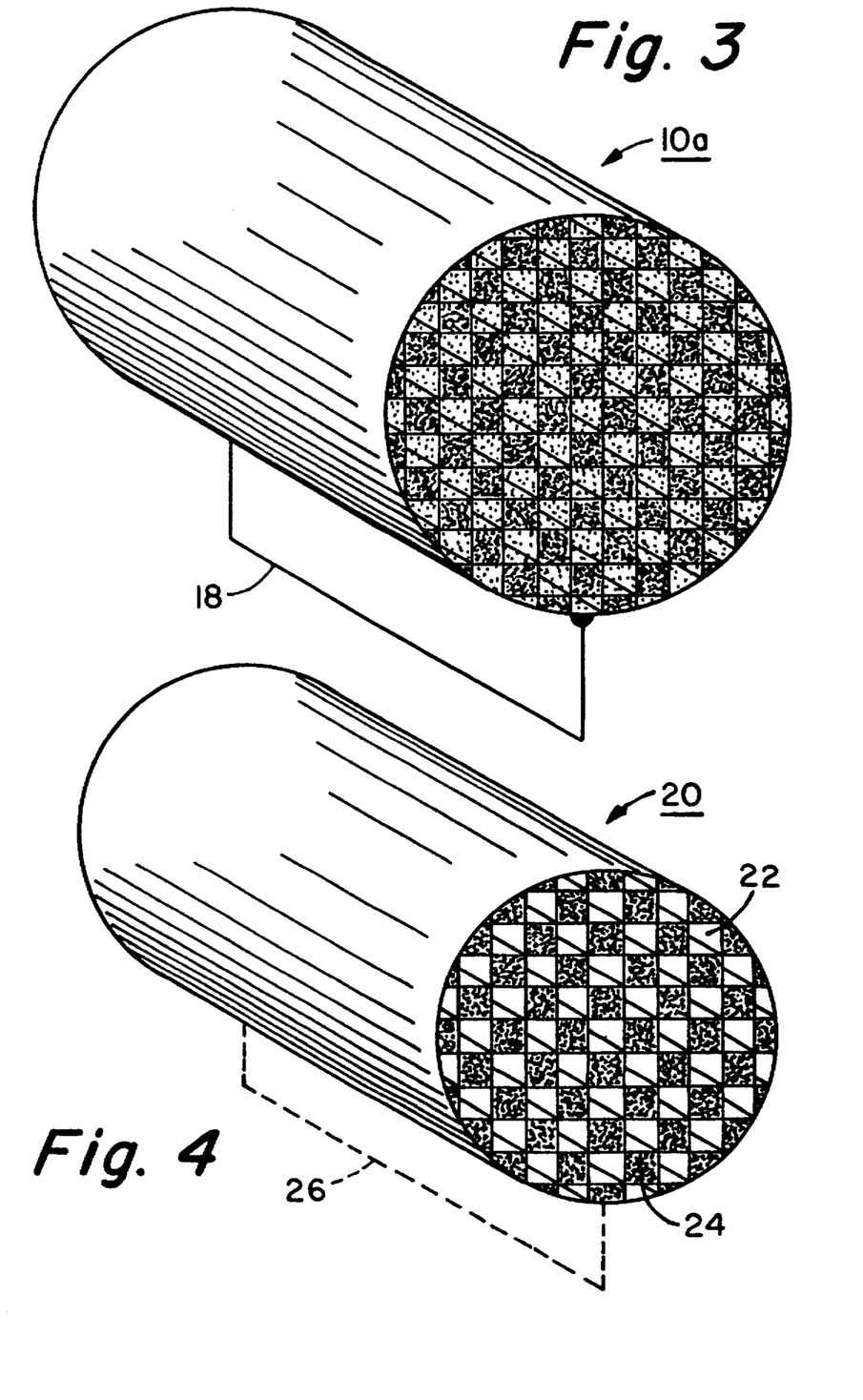
FIG. 3 is a schematic diagram of the device of FIG. 1 having electrically conducting means.
FIG. 4 is a schematic diagram of a device of the present invention which is a shaped body of activated carbon.

Because of these properties, the continuous coated filters, and most advantageously the non-electrically conducting filters, are excellent candidates for receiving electrically conducting means and conducting a uniform current therethrough. FIG. 3 shows a coated filter (10a) having electrically conducting means (18) for conducting current through the device.

In another embodiment, the activated carbon coating can be applied by the conventional technique of contacting a slurry of activated carbon particles and binder such as thermoplastic or thermosetting resin binder with the substrate. These binders can be carbonized to obtain a continuous carbon coating. Binders have to be in such proportion that conductivity of the carbon is not affected. Too much binder can coat particles of carbon and if binder system has high resistance to electricity, it can cause hot spot problems. Typically the binder should be less than about 15 wt. % of the carbon weight and preferably less than about 10%.

In accordance with a preferred embodiment, the device is made of a porous inorganic, e.g. ceramic honeycomb structure. The walls of the honeycomb structure are porous and form the particulate filtration medium. The alternate channels of the honeycomb structure are blocked such that the flow enters through the open channels on the inlet face and is forced through the walls of the honeycomb and exits through the open channels on the outlet face. The ceramic, e.g cordierite and/or mullite honeycomb structure is impregnated with activated carbon. The activated carbon adsorbs contaminants e.g., organic compounds in the flow stream while at the same time the controlled size of the pores in the honeycomb substrate wall can accomplish particulate filtration.

A catalyst or catalyst precursor can be coated onto the surfaces along with the activated carbon or carbon precursor. U.S. patent application Ser. No. 08/289,434, filed Aug. 12, 1994 now U.S. Pat. No. 5,488,023 describes some preferred methods of applying catalyst metals to a substrate with a carbon precursor. That application is herein incorporated by reference.

The advantage of having a catalyst with the activated carbon is that of having a ready-made reactor for continuous flow reactions. The catalyst is highly dispersed on the activated carbon coating. A catalyst precursor is most typically a compound e.g. organic or inorganic salt of a catalyst metal which decomposes to the catalyst metal or catalyst metal oxide on heating. Inorganic compounds can be e.g., oxides, salts such as chlorides, nitrates, carbonates, sulphates, complex ammonium salts, etc. Organic compounds can be e.g., organometallic halides of the appropriate type.

Typical catalyst metals are transition metal, alkali metal, alkaline earth, or combinations of these. Most useful are the noble metals, base metals or any combination of these. Advantageously the catalyst metals are Pt, Pd, Rh, Ag, Au, Fe, Co, Cr, Ni, Mn, Cu, Li, Mg, Ba Mo, Ru, Os, Ir, or combinations of these. Some examples of catalyst metals, although this list is not all inclusive, are V, Co, Cu, Ni or Fe oxides, for $NO_x$ and $SO_x$ conversion, noble metals and Cu, Zn, Co, Ni, Mn, Cr, Fe, for a variety of chemical reactions, etc.

One catalyst metal that is especially useful is platinum. When platinum is used, it is preferably combined with the carbon precursor in the form of a complex ammonium salt precursor such as ammonium chloroplatinate, $(NH_4)_2PtCl_4$.

In accordance with another embodiment, the activated carbon filter, that is, either an activated carbon coated non-electrically conducting substrate filter, or a filter made entirely of activated carbon, with or without a catalyst, can be fitted with electrically conducting means. U.S. patent application Ser. No. 08/249,897 filed May 26, 1994 describes some preferred methods and materials for doing this with non-conducting filters. That application is herein incorporated by reference as filed. In this embodiment, advantage is taken of the conductive properties of carbon. With the passage of an electric current through the carbon, the carbon heats up to a predetermined temperature depending on the resistance of the body and the voltage applied.

The electrically conducting means are positioned so as to be able to conduct an electric current through the device or more particularly, the carbon, to heat carbon uniformly. The actual positioning of the conducting means depends on the type of means and on the geometry of the device and the invention is not limited to any specific type of conducting means or geometry as long as the current generates uniform heating of the device without hot spots.

In general, the conducting means must provide a resistivity of at least about 0.001 ohm.cm, but typically at least about 0.01 ohms, and most typically at least about 0.10 ohm.cm. For most purposes of the present application, the resistivity is between about 0.10 ohm.cm and 25 ohm.cm.

For the purposes of the present invention resistivity of the body is defined by the formula:

$$\rho = \frac{R \cdot A}{L}$$

where $\rho$ is the resistivity in ohm.cm, R is the resistance in ohms, A is the area of a conducting surface in $cm^2$, and L is the distance between two conducting surfaces in cm.

The voltage and current requirement will vary depending on the application and the resistivity can be adjusted as desired according to the above equation. For example, if the device is to be heated in an oxygen containing atmosphere, such as air for automotive applications, the voltage and current should be such as to raise the temperature so that no hot spot in the body higher than about 350° C. If the device is to be heated in an inert or non-reacting atmosphere, e.g., $N_2$, the voltage and current should be such as to raise the temperature so that no spot in the body is higher than about 1000° C.

Some especially preferred conducting materials are metals as copper, silver, aluminum, zinc, nickel, lead, tin and their alloys, with the preferred being copper because of its high conductivity which minimizes resistance, and because it is inexpensive.

The conducting means is typically either in the form of a strip of the conducting material or electrode or a coating of conductive material on the monolith filter. In this invention, the term "conductive coating" refers to the coating which is applied to the total device and is thereby differentiated from the carbon coating of the carbon coated filters.

If an electrode is used, it can be applied by pressure contact e.g., a spring. Or a strip of conducting metal can be used and be attached to the filter by an electrically conducting adhesive such as e.g., silver-containing epoxies such as E-solder #3012 and #3021 from Acme Chemicals and Insulation Co.

A conductive coating is cost effective and gives a uniform resistance path so as to avoid hot spots.

One especially suitable geometry is having the conducting metal applied to opposing surfaces of the filter. By opposing surfaces is meant surfaces that are so spaced according to the geometry of the body that passage of current between the conductive surfaces produces a current that heats the carbon uniformly.

Metal filters can be fitted with electrodes as is commonly known in the art for electrically heated catalytic devices (EHC's).

The device can be designed with resistance and voltage suitable for raising the temperature of the structure depending on the heat required for the particular application. The device of the present invention with electrically conducting means can find use in applications in which desorbing adsorbed species takes place thus regenerating the device for reuse. In adsorption-desorption applications, the temperature can be raised significantly above the desorption temperature of the adsorbed species. Therefore, depending on the species adsorbed, the temperature can be controlled in such a way as to cause desorption of the adsorbed species.

This device is useful also in applications wherein heat enhances the performance of the device, as in chemical reaction catalysis, or wherein electric current enhances performance as in the killing of microorganisms during water purification.

The device can be useful in microbiological remediation applications such as in point of entry residential water purification and light commercial/industrial water applications. For example, microorganism in water can be removed from the water and held in the pores of the filter. They are then killed by passing an electric current through the device. The activated carbon adsorbs VOC's. The VOC's are volatilized by electric heating to regenerate the activated carbon. The high contact surface area, compact size, high flow rates, ability to conduct electricity through the device when it is in use, and ability to regenerate are all desirable features of the electrically heatable device of the present invention.

The device of the present invention having a catalyst with the activated carbon and an electrically conducting means finds use in VOC and organic dust removal and in catalyzing and/or burning off and desorbing and/or burning off hydrocarbons, in chemical processing, chemical processing catalysis via heating, and VOC abatement applications.

In accordance with an alternate embodiment, the device can be made of a multicellular activated carbon body having an inlet and outlet face wherein part of the total number of cells are plugged at the inlet end face and the remaining part of the total number of cells are plugged at the outlet end face. Here also as for the carbon coated filters, the preferred arrangement is having alternate cells plugged on a given end face. Such a device is shown in FIG. 4 as (20) having plugged and unplugged cells (22) and showing the plugs as (24).

The multicellular activated carbon bodies can be any of those known in the art and the invention is not limited to such. The preferred activated carbon bodies are honeycombs, preferably honeycombs extruded from raw material mixtures of activated carbon or activated carbon precursors such as thermosetting resins of the types described previously.

In accordance with one embodiment of producing an activated carbon filter, the activated carbon body is first formed from a carbon precursor such as a thermosetting resin as phenolic resin. This can be done by forming a mixture of the resin and binders, forming, e.g extruding into the shaped body, plugging the selected cells with resin, followed by carbonizing and activating according to well-known procedures. Alternately, plugging can be done after activating.

For example the activated carbon filter can be made by forming e.g. extrusion mixtures of activated carbon particles with suitable binders such as various clays such as disclosed in U.S. Pat. No. 4,518,704, or extruding a kneaded mass containing a thermosetting resin, a water-soluble thermosetting resinous additive as a binder and an extrusion aid, followed by drying and heat-treating, as disclosed in U.S. Pat. No. 4,399,052 both U.S. patents of which are herein incorporated by reference.

Also, the activated carbon filter can be make by extruding a mixture of thermosetting resin which is either solid such as phenolic novolak or liquid such as phenolic resole, having a high viscosity e.g. 100-1000 cps, hydrophilic filler, temporary organic binder, e.g. methylcellulose and/or its derivatives, and optionally extrusion aids e.g. sodium stearate, drying the shaped form and curing the resin, and carbonizing and activating the carbon to form the filter. These embodiments are disclosed in U.S. application Ser. No. 08/395,224, filed Feb. 27, 1995, now abandoned, and is herein incorporated by reference.

In these embodiments, for both liquid and solid resin systems, the filler must be hydrophilic in order to be easily wet by the liquids in the system. The fillers are most typically an oxygen-containing, e.g. oxide substance, and are therefore relatively inexpensive.

The fillers can be fibrous. Fibrous fillers typically give higher strength and stiffness to a structure compared a particulate structure. According to this invention, by fibrous is meant a length of up to about 1 centimeter, and preferably up to about 500 micrometers. The diameter is up to about 500 micrometers, preferably up to about 100 micrometers, and most preferably up to about 10 micrometers.

Depending on whether the resin is liquid or solid, the types of fillers that must be used will vary.

Using either liquid or solid resin alone presented certain problems that had to be solved.

For example, liquid resin has a very low viscosity and requires some type of filler to be extrudable. Elemental carbon fillers may be used to form an extrudable batch but on carbonization such structures have poor strength since the carbon filler does not bond to the resin.

For liquid resin systems, it was found that addition of a hydrophilic carbonizable (essentially organic) filler, with or without a hydrophobic organic filler, (preferably fibrous), is necessary to form a good honeycomb extrusion. Hydrophilic organic fibrous filler allows the liquid resin to infiltrate the fibrous structure at high loading levels. The mixture has good rigidity and is extruded into a honeycomb shape easily and maintains the shape on carbonization. Inorganic hydrophilic fillers preferably with a fibrous morphology can also be used with liquid resins in addition to the carbonizable filler. Mixtures of organic and inorganic fillers result in optimized strength and rigidity of the final carbon product, as well as minimization of cost. Inorganic fillers also minimize shrinkage and warpage.

Both natural and synthetic carbonizable fillers can be used. Some natural materials are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat straw, wool fibers, corn, potato, rice, and tapioca etc. Some synthetic materials are regenerated cellulose, rayon fabric, cellophane, etc.

Some examples of carbonizable fillers that are especially suited for liquid resins are cellulose, cotton, wood, and sisal, or combinations of these, all of which are preferably in the form of fibers.

One especially suited carbonizable fiber filler is cellulose fiber as supplied by International Filler Corporation, North Tonowanda, N.Y. This material has the following sieve analysis: 1–2% on 40 mesh (420 micrometers), 90–95% thru 100 mesh (149 micrometers), and 55–60% thru 200 mesh (74 micrometer).

Some inorganic fillers that can be used are oxygen containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, etc.

Some examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2–6 micrometers in diameter and about 20–50 micrometers in length.

Hydrophobic organic fillers provide additional support to the shaped structure and introduce wall porosity on carbonization because in general they leave very little carbon residue. Some hydrophobic organic fillers are polyacrylonitrile fibers, polyester fibers (flock), nylon fibers, polypropylene fibers (flock) or powder, acrylic fibers or powder, aramid fibers, polyvinyl alcohol, etc.

In general the particle or fiber size of the fillers must be such that they will be able to pass through the respective die in forming thin walled structures such as honeycombs. For example, for extrusion of a 0.15 mm (6 mil) wall honeycomb through a die that has 152 micrometer openings, up to about 420 micrometer long cellulose fibers have been found to work well. This example is merely illustrative and it is to be understood that the invention is not limited to specific size fillers for specific size structures.

For both solid and liquid resins, the filler makes up about 10% to 85 wt. % of the mixture (excluding any water that is added). The weight ratio of filler to resin is generally about 0.2 to 4.0.

One liquid resin mixture that is suitable for the present invention consists essentially of in percent by weight about 2% to 50% cellulose fibers, about 4% to 10% organic binder which is typically methylcellulose, and/or methylcellulose derivatives, 0% to about 15% hydrophobic organic filler such as polyester flock, polypropylene flock or powder, acrylic fibers or powders, etc, 0% to about 2% lubricant, e.g. soap, and the balance being phenolic resole.

More advantageously, the liquid resin mixture consists essentially of in percent by weight about 20% to 35% cellulose fibers, about 4% to 10% and more typically about 3% to 7% organic binder which can be methylcellulose, and/or its derivatives, 0% to about 2.0% lubricant, e.g., soap, and the balance being phenolic resole.

The above compositions can include additionally about 5% to 60% and more advantageously about 10% to 30% cordierite powder filler.

Another useful liquid resin mixture consists essentially of in percent by weight about 2% to 50% cellulose fibers, about 30% to 45% inorganic filler which can be any one or combination of cordierite powder, clay, and talc, about 4% to 10% organic binder which can be methylcellulose, and/or its derivatives, 0% to about 2% lubricant, e.g. soap, and the balance being phenolic resole.

More advantageously the composition consists essentially of in percent by weight about 9% to 25%, and most typically about 10% to 15% cellulose fibers, about 30% to 45% inorganic filler which can be clay, e.g. hydrite clay, talc, or cordierite powder, or combinations of these, about 4% to 10% organic binder which can be methylcellulose, and/or its derivatives, about 0% to 2.0%, e.g. soap, and the balance being phenolic resole.

Such compositions are advantageous for liquid resin systems because the carbonizable hydrophilic materials such as cellulose fibers soak in the liquid resin and form a stiff batch which can be extruded. Additionally on carbonization, they yield carbon which results in additional adsorption capacity. The inorganic filler reduces shrinkage on carbonization and imparts strength and stiffness and reduces batch cost.

Solid phenolic resin (novolak) is solid at room temperature, but melts at about 60°–75° C. The cure temperature is, however about 150° C.; As the extruded product is heated to cure the resin at about 1500° C., the structure collapses at about 75° C.

For solid systems, the filler stiffens the structure during the softening of the resin before cure. The filler can be either a carbonizable or an inorganic material. A combination of inorganic and carbonizable material is preferred. Hydrophobic organic fillers are also desirable in solid resin mixtures. The advantages of carbonizable and hydrophobic organic fillers have been previously discussed.

The preferred solid resin is novolak.

The carbonizable and inorganic fillers are the same as described above for liquid resins. For solid resins, fibrous inorganic fillers are especially useful.

One useful solid resin mixture composition consists essentially of in percent by weight about 2% to 50% cellulose fiber, about 5% to 50% inorganic filler which can be cordierite powder, talc, or combinations of these, about 5% to 10% organic binder which can be methylcellulose, and/or its derivatives, 0% to about 15% hydrophobic organic filler such as polyester flock, polypropylene flock or powder, acrylic fibers or powders, etc, 0% to about 2% lubricant, e.g. soap, and the balance being novolak.

More advantageously, the solid resin mixture composition consists essentially of in percent by weight about 8% to 22%, and more typically about 8% to 12% cellulose fiber, about 15% to 30% inorganic filler which can be cordierite powder and/or talc, about 5% to 10% organic binder which can be methylcellulose and/or its derivatives, 0% to 3%, and more typically about 0.5% to about 2% lubricant, e.g. soap, and the balance being novolak.

Another useful solid resin mixture composition consists essentially of in percent by weight about 5% to 50% aluminosilicate fiber, about 5% to 50% carbonizable filler, about 4% to 10% organic binder which can be methylcellulose, and/or its derivatives, about 1% to about 3% lubricant, and the balance being novolak.

More advantageously the mixture composition consists essentially of in percent by weight about 8% to 15% aluminosilicate fiber, about 5% to 20% hydrophobic organic filler, e.g. polyester flock, about 4% to 10% organic binder which can be methylcellulose and/or its derivatives, about 1% to about 3% lubricant, e.g. soap, and the balance being novolak.

The mixture components are blended. Most typically dry components are blended after which they are blended with the liquid components in a muller. Water is added if necessary to make the mixture handleable for extrusion. The mixture is then extruded. Conventional extrusion equipment can be used. For example, the extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The shaped bodies are then dried. Drying can be done in air at room temperature–80° C., or in dielectric or microwave dryers.

The dried bodies are then cured in the shaped form by heating under the specific temperature and time conditions required for the specific resin. The curing can be done in a conventional oven. Standard curing conditions can be found in the manufacturer's literature. For example, for phenolic resole 43290 from Occidental Chemical Co. the body is heated in air to about 140°–155° C. The final temperature is attained slowly so that the body does not distort. For example, the body is first heated to about 90° C.–1000° C., then to about 120° C.–130° C. and held at this temperature for about 1–2 hours. It is then heated to about 140° C.–155° C. and held for about 30 minutes–2 hours for final cure. Curing can also be done in a dielectric or microwave oven.

The carbonization is carried out by heating the body in an inert or reducing atmosphere such as nitrogen or argon or forming gas. Forming gas is a mixture of nitrogen and hydrogen. Typical mixtures by volume are 92:8 or 94:6 $N_2:H_2$, although any mixtures can be used. Carbonization temperatures are about 600° C.–1000° C. or more typically about 700°–1000° C. for a length of time of usually about 1–20 hours. While the body is in the temperature range of about 300°–600° C., the fugitive materials vaporize. During carbonization low molecular weight compounds separate out and carbon atoms form graphitic structures. For example for phenolic resole resin 43290 from Occidental Chemical Co. and Furan Furcarb resin from QO Chemicals, carbonization is done by heating at a rate of about 150° C./hr in $N_2$. The temperature is held at about 900° C. for about 6–10 hours to complete the carbonization. The temperature is then reduced to 25° C. at a cooling rate of about 150° C./hr. On carbonization, the body contains random three dimensional oriented graphitic platelets with amorphous carbon between the platelets.

The activation is done by partially oxidizing in a suitable oxidant such as $CO_2$, steam, air, or a combination of these, etc. Activation can be carried out at temperatures between about 700° C.–1000° C. Activation conditions depend on type and amount of resin, flow rate of gas, etc. For example for phenolic resole and Furcab resins activation conditions are at about 900° C. for about 1 hour in $CO_2$ at a flow rate of about 14.2 l/hr. (about 0.5 CFH ($ft.^3/hr.$)). The partial oxidation during activation causes the removal of the amorphous carbon and the formation of molecular size porosity between the graphitic platelets. This porosity and the graphitic platelets impart the adsorption characteristics to the resulting activated carbon body.

The multicellular activated carbon body is then made into a filter by plugging selected cells at the inlet and outlet faces in the manner previously described for the inorganic filter. It is preferred here also that the cells be alternately plugged as described previously.

The plugging material can be any material that will adhere to the activated carbon, such as polymeric materials, resin, etc. The plugging can be done by known techniques of masking the cells that are to be open, and applying the plugging material to the cells that are to be plugged. The resin plug is also carbonized and activated and forms a stable adherent plug.

In the making of the activated carbon filter, catalyst material can be added to the forming mixture or washcoated onto the body after activation to form a catalyzed activated carbon filter body.

Also, the activated carbon body, catalyzed or uncatalyzed, can be made electrically conducting as described previously for the activated carbon coated inorganic filters. FIG. 4 shows an activated carbon filter having an electrically conducting means (26) for conducting an electric current therethrough.

To more fully illustrate the invention, the following non-limiting examples are presented. All parts, portions, and percentages are on a weight basis unless otherwise stated.

EXAMPLE 1

A cordierite honeycomb with about 15 cells/$cm^2$ (about 100 cells/$in^2$) and about a 0.5 mm (20 mil) wall thickness with a wall open porosity of about 47% was obtained with alternate channels blocked at the two ends. The ends were blocked with cordierite cement and the honeycomb was fired to obtain strong plugs at the end of the channels. The honeycomb was then dipped in a phenolic resole resin of about 100 cps viscosity. The resin coated the entire structure. The resulting coated or impregnated honeycomb was then drained of excess resin and then dried at about 80° C. and then cured at about 150° C. to solidify the resin. This honeycomb was then subjected to carbonization at about 900° C. in nitrogen for about 5 hours. The resin carbonizes with about 50% carbon yield. The carbon was then activated at about 900° C. with carbon dioxide.

A water stream was introduced from one end of the structure and it flowed through the walls and exited through the other end via the open channels. Substantial water flow was obtained at low (12.7 cm. or 5" water) pressure drop.

EXAMPLE 2

An experiment to show hydrocarbon removal efficiency was done with a representative mixture of an alkane, alkene, aromatic hydrocarbon and chlorinated hydrocarbon. A water solution containing about 12 ppm each of chloroform, trichloroethane, trichloroethylene, and toluene was contacted with the honeycomb described in Example 1. In the resulting treated water the concentration of each of the above compounds dropped below the detection limit of the GC/MS unit (3 ppm). This experiment proves that a variety of organic compounds can be removed by the filter.

EXAMPLE 3

Cordierite honeycombs of various compositions were made up and their total wall porosity (volume %) as well as median pore size were measured via mercury porosimetry. The data is shown in the following table.

TABLE

| HONEYCOMB # | TOTAL POROSITY % | PORE SIZE (MICRONS) |
|---|---|---|
| 1 | 37.3 | 4.1 |
| 2 | 36.0 | 9.02 |
| 3 | 49.7 | 12.3 |
| 4 | 23.3 | 0.5 |
| 5 | 30.8 | 0.87 |
| 6 | 30.0 | 0.97 |
| 7 | 35.5 | 1.90 |
| 8 | 37.3 | 2.5 |

The example shows that honeycombs can be made with pore sizes varying from about 0.5 micrometers to 15 micrometers. If desired, honeycombs with pore sizes of about 0.05 to 50 micrometers can be made.

The examples above show that particulate and VOC filtration device can be made with properties to suit any particular application can be made.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A device for purifying a workstream, the device comprising:
   a) a monolithic porous particulate filter made of material selected from the group consisting of ceramic, glass ceramic, glass, metal, and combinations thereof; and
   b) a continuous uninterrupted coating of activated carbon distributed over the outer surface and interlocked within the porosity of the filter the activated carbon being derived from a carbon precursor.

2. A device of claim 1 wherein the filter is made of material selected from the group consisting of cordierite, mullite, and combinations thereof.

3. A device of claim 1 wherein the filter is made of non-electrically conducting material.

4. A device of claim 3 further comprising electrically conducting means on the filter for conducting an electric current through the device.

5. A device of claim 1 wherein the filter comprises a multicellular monolith having inlet and outlet faces, and a matrix of porous walls defining a plurality of cells extending longitudinally and mutually therethrough between the inlet and outlet faces, a portion of the total number of cells being plugged at the inlet end face, and the remaining portion of the total number of cells being plugged at the outlet end face of the monolith.

6. A device of claim 5 wherein the filter is made of material selected from the group consisting of cordierite, mullite, and combinations thereof.

7. A device of claim 5 wherein the filter is made of non-electrically conducting material.

8. A device of claim 7 further comprising electrically conducting means on the filter for conducting an electric current through the device.

9. A device for purifying a workstream, the device comprising a filter structure wherein essentially all of the filter structure is made of activated carbon, wherein essentially all of the activated carbon is derived from a carbon precursor, having inlet and outlet faces, and a multiplicity of cells separated by porous walls and extending longitudinally and mutually parallel therethrough from inlet to outlet end, a portion of the total number of cells being plugged at the inlet end face, and the remaining portion of the total number of cells being plugged at the outlet end face of the device.

10. A device of claim 9 further comprising electrically conducting means thereon for conducting an electric current therethrough.

11. A method of making a device for purifying a workstream, the method comprising:
   a) providing a multicellular activated carbon structure, wherein the activated carbon is derived from a carbon precursor, having inlet and outlet end faces, and a matrix of porous walls defining a plurality of cells extending longitudinally and mutually parallel therethrough between the inlet and outlet end faces; and
   b) plugging a portion of the total number of cells at the inlet end face, and plugging the remaining portion of the total number of cells at the outlet end face to form said device, said device having a filter structure.

12. A method of claim 11 comprising the additional step of providing electrically conducting means on the filter for conducting an electric current through the device.

* * * * *